US 6,674,575 B1

United States Patent
Tandler et al.

(10) Patent No.: US 6,674,575 B1
(45) Date of Patent: Jan. 6, 2004

(54) TRANSMITTED LIGHT/LIGHTING DEVICE FOR MICROSCOPES

(75) Inventors: Hans Tandler, Jena (DE); Matthias Gonschor, Gleichen (DE); Peter Gretscher, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/009,912

(22) PCT Filed: Apr. 22, 2000

(86) PCT No.: PCT/EP00/03661
§ 371 (c)(1),
(2), (4) Date: Mar. 5, 2002

(87) PCT Pub. No.: WO00/65398
PCT Pub. Date: Nov. 2, 2000

(30) Foreign Application Priority Data

Apr. 27, 1999 (DE) .......................... 199 19 096

(51) Int. Cl.⁷ .......................... G02B 21/06; G02B 21/00
(52) U.S. Cl. .................... 359/389; 359/368; 359/385
(58) Field of Search .................... 359/368–390

(56) References Cited

U.S. PATENT DOCUMENTS

| 4,253,726 A | * | 3/1981 | Taira .......................... 359/385 |
| 4,601,551 A | | 7/1986 | Pettingell et al. .......... 359/389 |
| 4,756,611 A | * | 7/1988 | Yonekubo et al. .......... 359/388 |
| 4,852,985 A | | 8/1989 | Fujihara et al. ............ 359/385 |
| 5,136,429 A | | 8/1992 | Bergner et al. ............ 359/663 |
| 5,684,627 A | * | 11/1997 | Ganser et al. .............. 359/388 |
| 5,690,417 A | | 11/1997 | Polidor et al. ............. 362/244 |
| 5,777,784 A | | 7/1998 | Tanaka ....................... 359/388 |
| 6,011,647 A | * | 1/2000 | Geschwentner ............ 359/389 |
| 6,369,939 B1 | * | 4/2002 | Weiss et al. ............... 359/387 |

FOREIGN PATENT DOCUMENTS

| DE | 1 938 835 | | 1/1971 |
| DE | 31 08 389 | * | 4/1982 |
| DE | 37 34 691 | | 4/1988 |
| DE | 39 06 555 | | 7/1989 |
| DE | 41 04 609 | | 8/1992 |
| DE | 197 26 518 | | 2/1999 |
| DE | 196 44 862 | * | 4/2000 |
| JP | 4-125609 | * | 4/1992 |

* cited by examiner

Primary Examiner—Thong Nguyen
(74) Attorney, Agent, or Firm—Reed Smith LLP

(57) ABSTRACT

A transmitted-light illumination arrangement for microscopes has at least one LED which is arranged interchangeably in or in the vicinity of the plane of the aperture diaphragm of illumination optics or in front of Köhler illumination optics. The transmitted-light illumination arrangement advantageously has at least one LED light source radiating in the illumination direction of the microscope and at least one LED light source radiating in the opposite direction, wherein the light of the oppositely radiating light source is deflected in the illumination direction via deflecting mirrors, preferably a concave mirror, this light source being located in the focal point thereof.

7 Claims, 3 Drawing Sheets

TRANSMITTED LIGHT/LIGHTING DEVICE FOR MICROSCOPES

CROSS-REFERENCE TO RELATED APPLICATIONS

This application claims priority of International Application Serial No. PCT/EP00/03661, filed Apr. 22, 2000 and German Application No. 199 19 096.8 filed, Apr. 27, 1999, the complete disclosures of which are hereby incorporated by reference.

BACKGROUND OF THE INVENTION

Illumination arrangements in microscopes have a relatively poor efficiency in converting received electrical power into useful light output and they generate bothersome heat. Further, upright stands require installation space which impedes ergonomically favorable arrangements of the microscope stage. Finally, the solutions have many structural component parts and are therefore expensive. Illumination arrangements for microscopes with LEDs or LCDs are known from DE 3108389A1, U.S. Pat. No. 4,852,985, DE 3734691 C2, and DE 19644662A1.

OBJECT AND SUMMARY OF THE INVENTION

The disadvantages mentioned above are to be overcome, in accordance with a primary object of the invention, by an LED illumination unit comprising one or more arranged LEDs which are mains-operated or are operated by batteries, as selected.

This object is achieved by a transmitted-light illumination arrangement for microscopes, with at least one LED which is arranged interchangeably in or in the vicinity of the plane of the aperture diaphragm of illumination optics or in front of Köhler illumination optics.

The invention and its effects and advantages are described in the following with reference to the schematic drawings.

DESCRIPTION OF THE PREFERRED EMBODIMENTS

Figure 1:
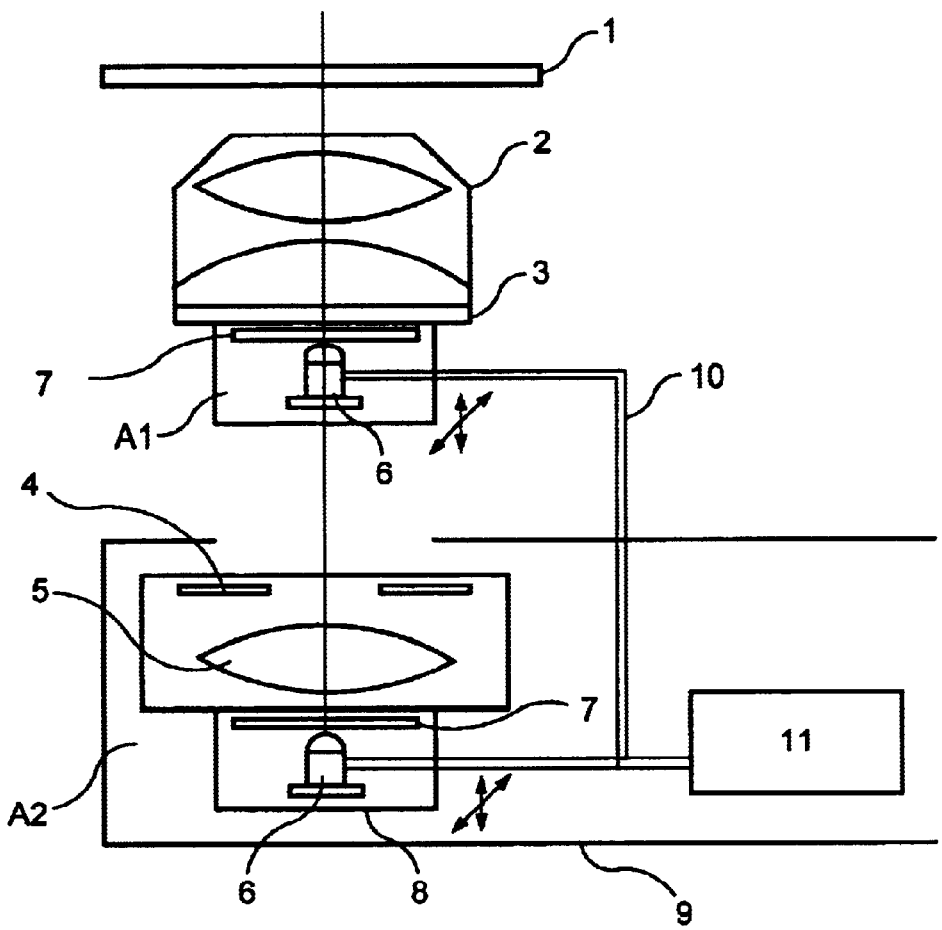
FIG. 1 illustrates in schematic form a Köhler illumination unit arranged below a transparent microscope stage on which is located a specimen.

In FIG. 1, a Köhler illumination unit which comprises condenser optics 2, aperture diaphragm 3, field diaphragm 4 with collector 5 and which is arranged in a microscope stand, not shown, is arranged below a transparent microscope stage 1 on which is located a specimen that is observed through an objective, not shown. An LED illumination unit which preferably includes diffusing means such as a diffusion plate 7 and which, in this instance, comprises an individual LED 6 but is also possible as an arrangement of a plurality of LEDs, is designed in such a way that it can be arranged in the aperture diaphragm plane (A1) as well as in the microscope base (A2). For this purpose, the LED 6 is located in a plug-in module or insert 8 which can be arranged optionally (alternate direction shown by arrows) in the stand base 9 or directly below the aperture diaphragm.

Figure 2:
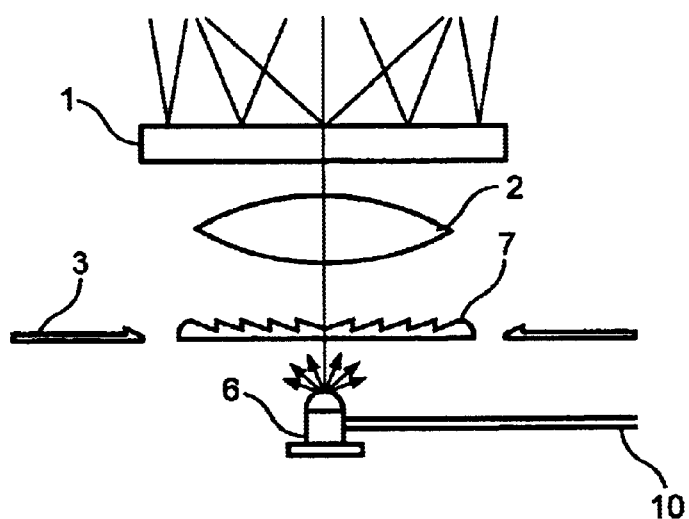
FIG. 2 illustrates the employment of diffusing means in the arrangement.

The LED is supplied with electricity by a power supply 11. When combined with suitable diffusing means such as is shown in FIG. 2, wherein the diffusing means can be a ground glass screen with a zone plate structure (Fresnel lens) or a microlens array in or in the vicinity of the aperture diaphragm plane, the arrangement A1 in the aperture diaphragm plane enables illumination of sufficiently large fields and apertures and represents an economical brightfield illumination when no field diaphragm is required.

Diffusing means can also be arranged directly below the specimen slide. Further, the microscope stage can be arranged lower and at an ergonomically favorable height below the work stage or table, which is especially advantageous for routine operation.

The arrangement A2 in the base of the instrument makes it possible to use a field diaphragm and, therefore, to carry out the Köhler illumination method and all conventional contrasting methods.

A stand can also be converted with the same LED illumination unit between the arrangements 1 and 2. When a field diaphragm and collector are joined to form a unit which can likewise be retro-fitted, this unit can also be dispensed with when only arrangement A1 is used.

The module contains the LED and the diffusing means, if provided. The power supply 11 is preferably arranged in the microscope base 9; the leads 10 to the LED module can be fixed in place at both positions 1 and 2 and the connection is then plugged directly into the LED module. But the power supply can also (battery) be accommodated directly in the module.

The mechanical receptacles at both positions are designed in such a way that the module can be plugged in either from below or from the side. Further advantages of using the LED illumination unit consist in a long service life, minimal energy requirement, daylight-like color temperature, color temperature-dependent brightness adjustment and low heat development.

Figure 3:
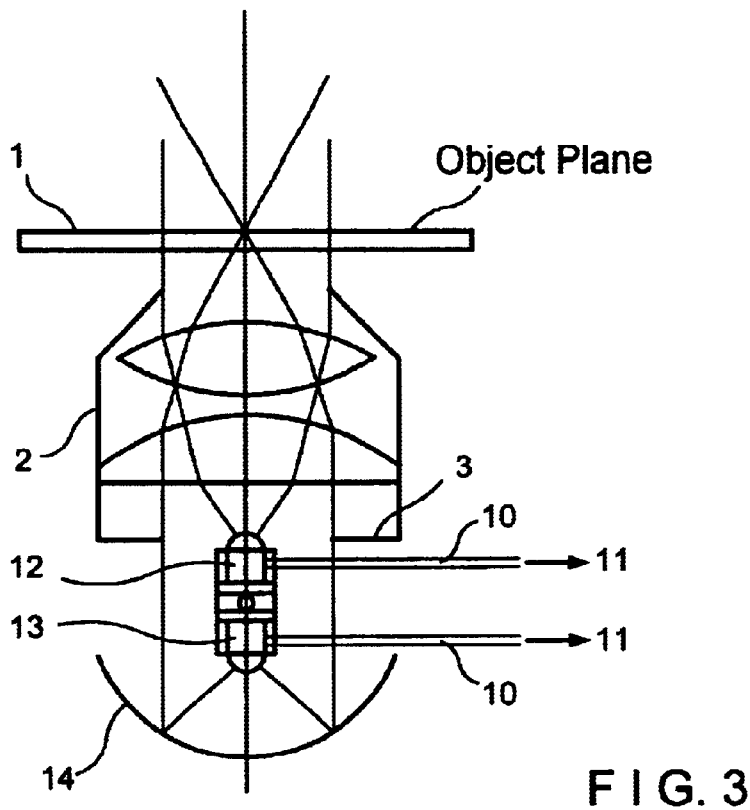
FIG. 3 illustrates in schematic form a selected quantity of white-light LEDs arranged in the vicinity of the aperture diaphragm plane.

As is shown in FIG. 3, a suitably selected quantity of white-light LEDs (preferably 2) is arranged in the vicinity of the aperture diaphragm plane. One LED 12 radiates upward and the second LED 13 radiates downward. The lower LED is arranged in the focal point of a concave mirror 14. Minor problems with vignetting can be minimized by dimensioning the LED block so as to be as small as possible. The LED 12 which radiates upward functions as the primary field illumination via the condenser 2, while the LED which radiates downward is arranged in the focal point, preferably, of a parabolic mirror 14, reflected back in parallel, and provides for the necessary aperture illumination via the condenser 2.

Figure 4:
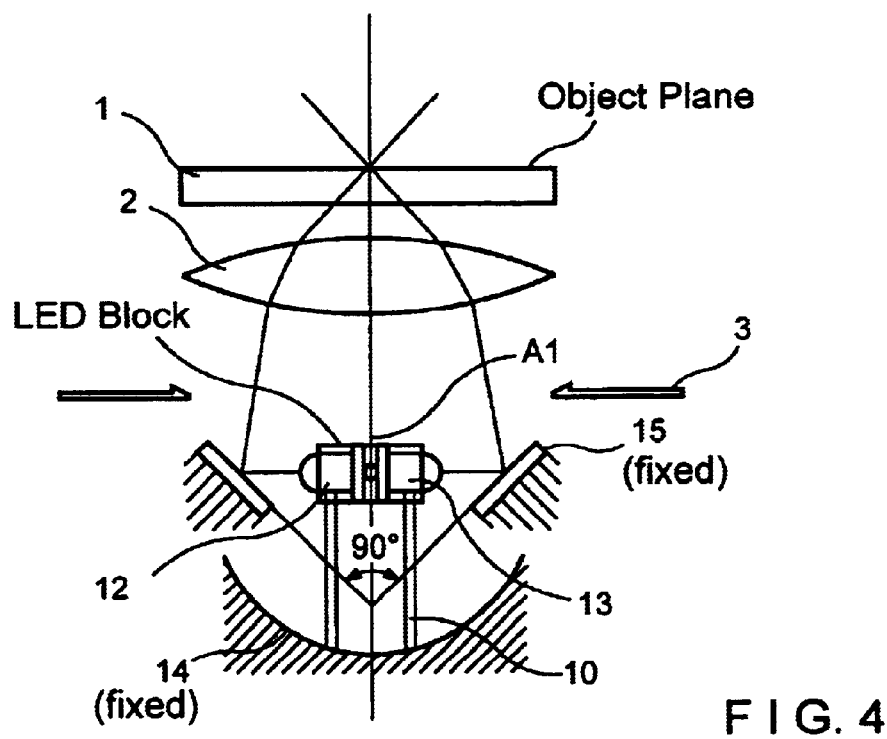
FIG. 4 schematically illustrates a variation of the arrangement of FIG. 3.

The block of both LEDs 12 and 13 can also be rotated by 90° about an axis of rotation A1 at right angles to the drawing plane as is shown in FIG. 4 and accordingly radiates to the left and right.

Oblique illumination is generated via two deflecting mirrors 15 or a deflecting mirror ring, wherein the LEDs can be arranged so as to be rotatable about the optical axis in their center axes in addition to the rotation mentioned above. The flow of radiation from the LEDs which are timed, via their power supply, with an observation shutter is reflected in direction of the condenser at the angles required for generating a three-dimensional image through the illumination.

This arrangement can also be combined with the arrangement in FIG. 3 as is shown schematically in FIG. 4.

For this purpose, the LEDs are swiveled about an axis A1 at their center of connection at right angles to the drawing plane between the position in FIGS. 3 and 4 with stationary concave mirror 14 and deflecting mirrors 15 or mirror ring.

Further, the angles between the center axes of the LEDs and/or their distance to the optical axis can be changed.

For this purpose, the LEDs are displaceable at right angles to the optical axis as is indicated by the arrows or are swivelable at right angles to the drawing plane about an axis of rotation A2.

Figure 6A:
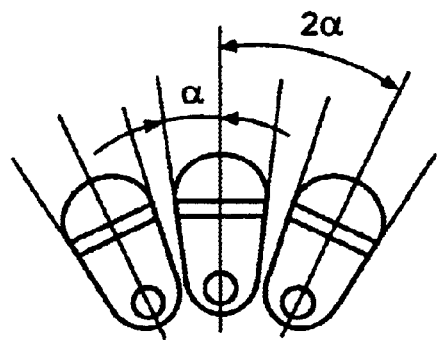
FIGS. 6a and 6b illustrate different arrangements of LEDs which are applicable to the arrangements according to FIGS. 1, 2 and 5.

With the illumination timed for observation, the illumination angle, and therefore the basis for spatial observation, changes in this way. In this case also, the LEDs are located as close as possible to the aperture diaphragm plane. FIG. 6 shows how a plurality of white-light LEDs are arranged as closely as possible in a plane conjugate to the pupil, which can also be a spherical surface, and accordingly also provide for the required light transmitting value without diffusing means.

For this purpose, the LEDs are arranged in such a way that the tangents of their radiating cones contact one another (FIG. 6a) in that the angle between the center axes of their radiating cone essentially coincides with the angle of the radiating cone.

Figure 6B:
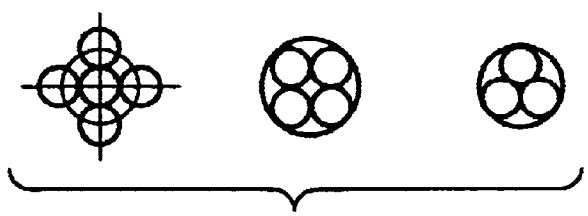

Due to the fact that individual LEDs are parallel-connected over a surface area in different arrangements, as is shown in FIG. 6b, a larger radiating surface can be offered with the same divergence angle as that of an individual LED. A larger surface as well as a larger sum radiating angle are generated by means of directed tilting and bouquet-like combination of the individual LEDs such that the tangents of the radiating cone contact.

Figure 5:
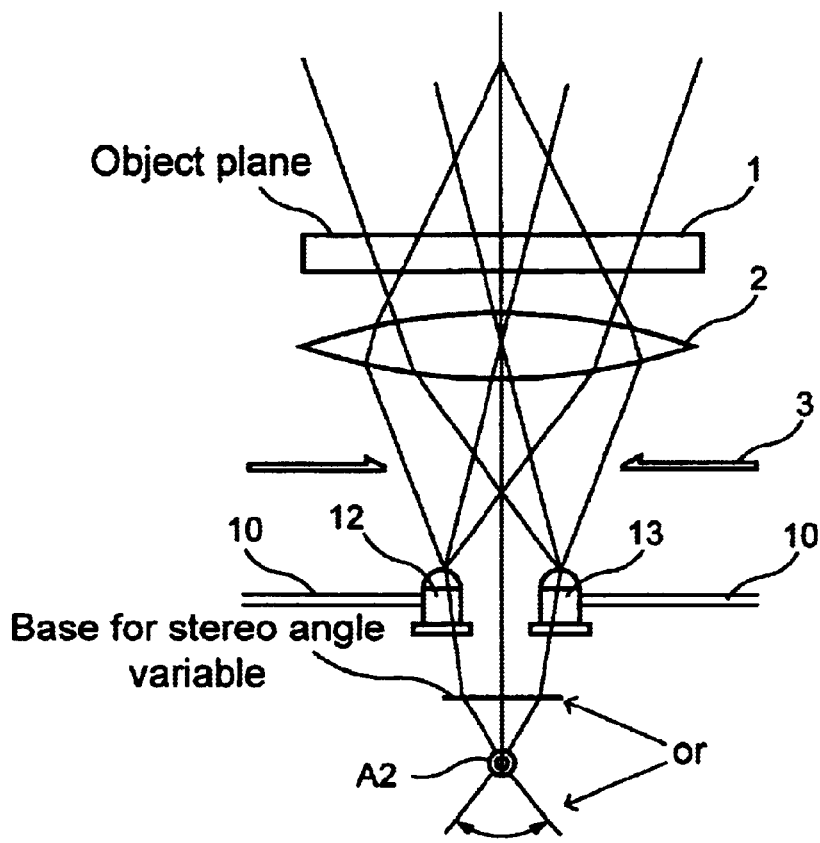
FIG. 5 schematically illustrates a further arrangement in accordance with the invention.

Arrangements according to FIG. 6 are advantageously applicable in the arrangements according to FIGS. 1, 2 and 5.

Further, the field illumination and aperture illumination can also be carried out by means of an array of microlenses with different focal lengths.

Diffusing means can also be integrated directly in the zone plate or lens array. Accordingly, for example, the underside of the zone plate shown in FIG. 2 can be frosted or an additional ground glass screen can be arranged above the zone plate.

While the foregoing description and drawings represent the present invention, it will be obvious to those skilled in the art that various changes may be made therein without departing from the true spirit and scope of the present invention.

What is claimed is:

1. A transmitted-light illumination arrangement for a microscope comprising:

an illumination optics having an aperture diaphragm and a field diaphragm;

a first receptacle disposed in the vicinity of the aperture diaphragm;

a second receptacle disposed in the vicinity of the field diaphragm; and at least one LED which can be interchangeably positioned in the first receptacle to provide LED light through an aperture of the aperture diaphragm or the second receptacle to provide LED light through an aperture of the field diaphragm of the illumination optics.

2. The arrangement according to claim 1, wherein the at least one LED is arranged in a stand base in front of the field diaphragm of the illumination optics.

3. The arrangement according to claim 1, wherein an optical element for light scattering is arranged downstream of the at least one LED in the direction of light.

4. The arrangement according to claim 1, wherein the at least one LED with diffusion plate and/or illumination optics is arranged in an insert module.

5. A transmitted-light illumination arrangement for a microscope comprising:

an illumination optics having an aperture diaphragm positioned below a microscope stage and a field diaphragm positioned below the aperture diaphragm;

a first receptacle disposed in the vicinity of the aperture diaphragm;

a second receptacle disposed in the vicinity of the field diaphragm; and a light emitting diode (LED) module having at least one LED, the LED module capable of being interchangeably received in either the first receptacle to provide LED light through an aperture of the aperture diaphragm or the second receptacle to provide the LED light through an aperture of the field diaphragm.

6. The arrangement according to claim 5, wherein the second receptacle is arranged in a stand base in front of the field diaphragm.

7. The arrangement according to claim 5, wherein the LED module includes a light diffuser positioned downstream of the at least one LED in the direction of light.

* * * * *